United States Patent
Lee et al.

(10) Patent No.: US 7,790,127 B1
(45) Date of Patent: Sep. 7, 2010

(54) $NO_x$ EMISSION CONTROL SYSTEM FOR HYDROCARBON FUELED POWER SOURCE

(75) Inventors: Jong H. Lee, Rochester Hills, MI (US); Byong Kwon Cho, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/395,988

(22) Filed: Mar. 2, 2009

(51) Int. Cl.
B01D 53/94 (2006.01)
F01N 3/10 (2006.01)
F01N 3/18 (2006.01)
G05D 7/00 (2006.01)

(52) U.S. Cl. ............... 423/213.2; 423/213.7; 423/239.1; 423/245.3; 423/247; 422/105; 422/108; 422/111; 422/168; 422/169; 422/170; 422/172; 422/177; 422/180; 60/299; 60/301; 60/306

(58) Field of Classification Search ............... 423/213.2, 423/213.7, 239.1, 245.3, 247; 422/168, 169, 422/170, 172, 177, 180, 105, 108, 111; 60/299, 60/301, 306
See application file for complete search history.

(56) References Cited

U.S. PATENT DOCUMENTS

| 6,959,538 | B2 |  | 11/2005 | Cho et al. |  |
| 7,065,958 | B2 | * | 6/2006 | Funk et al. | 60/286 |
| 7,090,811 | B2 |  | 8/2006 | Cho et al. |  |
| 7,368,094 | B2 |  | 5/2008 | Cho et al. |  |
| 2008/0307774 | A1 | * | 12/2008 | Gonze et al. | 60/286 |

* cited by examiner

*Primary Examiner*—Timothy C Vanoy
(74) *Attorney, Agent, or Firm*—Reising Ethington P.C.

(57) ABSTRACT

A method of reducing $NO_x$ in a lean burn engine exhaust stream from a hydrocarbon burning engine may be first passing the exhaust stream over a thrifted diesel oxidation catalyst that substantially completes the oxidation of carbon monoxide to carbon dioxide and the oxidation of hydrocarbons (HC) to carbon dioxide and water. Next, separate additions of ozone and ammonia or urea may be introduced to the exhaust gas stream upstream of the catalytic reduction reactor at temperatures below 250 degrees Celsius. The additions of ozone and ammonia or urea modify the exhaust gas composition to improve the performance of $NO_x$ reduction catalysts in the catalytic reduction reactor. At temperatures above 250 degrees, the ozone addition may be reduced or eliminated, while the ammonia addition can be controlled as a function of the amount of NOx in the exhaust stream and the temperature of the catalytic reduction reactor.

20 Claims, 1 Drawing Sheet

NO$_x$ EMISSION CONTROL SYSTEM FOR HYDROCARBON FUELED POWER SOURCE

TECHNICAL FIELD

The technical field generally relates to treatment of exhaust gas from a hydrocarbon fueled power source, operated with a fuel lean combustion mixture.

BACKGROUND

Diesel engines, some gasoline fueled engines and many hydrocarbon fueled power plants are operated at higher than stoichiometric air to fuel mass ratios for improved fuel economy. Such lean-burning engines and other power sources, however, produce a hot exhaust with a relatively high content of oxygen and nitrogen oxides (NO$_x$). In the case of diesel engines, the temperature of the exhaust from a warmed up engine is typically in the range of 200 degrees to 400 degrees Celsius, and has a typical composition, by volume, of about 17% oxygen, 3% carbon dioxide, 0.1% carbon monoxide, 200 ppm hydrocarbons, 200 ppm NO$_x$ and the balance nitrogen and water. These NO$_x$ gases, typically comprising nitric oxide (NO) and nitrogen dioxide (NO$_2$), are difficult to reduce to nitrogen (N$_2$) because of the high oxygen (O$_2$) content in the hot exhaust stream.

SUMMARY OF EXEMPLARY EMBODIMENTS OF THE INVENTION

Exemplary embodiments include a method and apparatus for reducing NO$_x$ in a lean burn engine exhaust stream over a wide variety of temperatures, including during warm-up conditions.

One exemplary embodiment includes a method wherein an exhaust stream from a hydrocarbon burning engine such as diesel engine may be first passed over a catalytic oxidation reactor having a thrifted diesel oxidation catalyst (DOC), which substantially completes the oxidation of carbon monoxide to carbon dioxide and the oxidation of hydrocarbons (HC) to carbon dioxide and water.

Next, separate additions of ozone and ammonia or urea may be introduced to the exhaust gas stream upstream of a catalytic reduction reactor. The ozone addition, via a controllable ozone generator, converts much of the NO content of the exhaust to NO$_2$ before the exhaust stream reaches the reduction catalyst reactor. The ammonia or urea participate in the reduction of NO and NO$_2$ to N$_2$. The additions of ozone and ammonia or urea therefore modify the exhaust gas composition to improve the performance of NO$_x$ reduction catalysts (i.e., SCR catalysts) in the catalytic reduction reactor, which reduces NO$_x$ to nitrogen and water, including during engine and exhaust warm-up temperatures (i.e., cold start conditions) below about 250 degrees Celsius.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
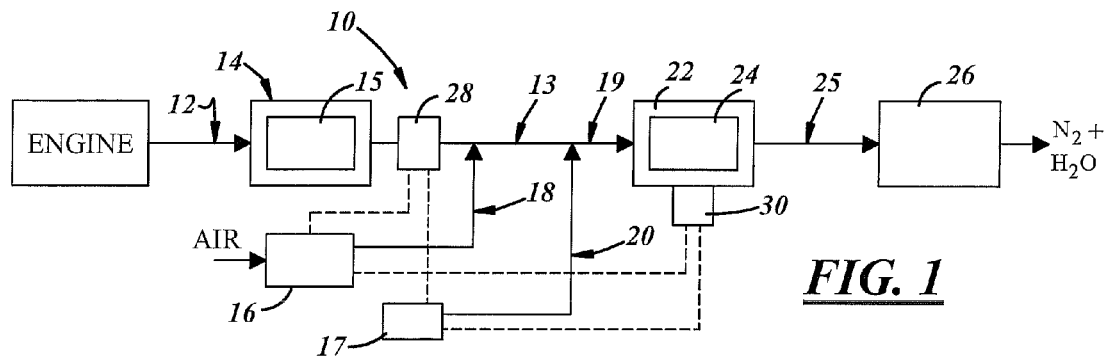
FIG. 1 is a schematic flow diagram of an exhaust system for a lean-burn engine.

A flow diagram of an exhaust system 10 for a hydrocarbon burning engine is illustrated according to one exemplary embodiment in FIG. 1. An exhaust stream or conduit 12 from the exhaust manifold of an engine operating at an air-to-fuel mass ratio well above the stoichiometric ratio is to be treated to reduce the NO$_x$ (mainly a mixture of NO and NO$_2$) content to nitrogen (N$_2$). When the exhaust stream 12 is from a gasoline-fueled engine operated, for example, at an air to fuel ratio of greater than 14 (i.e., A/F>14), the exhaust gas contains some unburned hydrocarbons (HC), NO$_x$, carbon monoxide (CO), carbon dioxide (CO$_2$), water (H$_2$O) and nitrogen (N$_2$). The exhaust stream 12 from a diesel engine contains the same gaseous constituents plus suspended diesel particulates (composed of high molecular weight hydrocarbons deposited on carbon particles).

Such hydrocarbon containing exhaust streams 12 may be passed through a catalytic oxidation reactor 14 having a thrifted diesel oxidation catalyst (DOC) 15, which substantially completes the oxidation of carbon monoxide to carbon dioxide and the oxidation of hydrocarbons to carbon dioxide and water. There is typically abundant oxygen in the exhaust gas stream 12 for these reactions.

Ambient air alone, or alternatively air combined with exhaust (shown as AIR in FIG. 1), may be blown or drawn through an ozone generator 16 such as a hyperplasma ozone generator 16. The plasma generated in the air stream converts some of the oxygen molecules to ozone (O$_3$). The amount of ozone generated is related to the level of electric power applied to the ozone generator 16. Other activated oxygen species may also be generated. The ozone containing stream 18 may be added to the exhaust stream 12 upstream of catalytic reduction reactor 22 and downstream of the catalytic oxidation reactor 14 and may be used for oxidation of NO to NO$_2$. The input power of the ozone generator 16 may be controlled by the amount of NO$_x$, or any of the components of NO$_x$ as described above, in the exhaust stream 12 that is to be oxidized, or by the temperature of the downstream catalytic reduction reactor 22, or by both the amount of NOx in the exhaust stream and the temperature of the catalytic reduction reactor 22, as will be described in further detail below.

One non-limiting example of a non-thermal ozone generator 16 that may be utilized herein is described in U.S. Pat. No. 7,090,811 to Cho et. al., entitled "Method of Reducing NO$_x$ in Diesel Engine Exhaust", and herein incorporated by reference.

In addition to ozone addition for NO oxidation, ammonia (NH$_3$) or urea may also be added to exhaust stream 12. Ammonia can be stored in a suitable form (such as liquid ammonia or as urea) on-board a lean burn engine vehicle, or near-by a stationary engine, collectively referred to herein as an ammonia injector device 17, and added as stream 20 to the ozone-treated exhaust stream 13 upstream of catalytic reduction reactor 22. The ammonia or urea participate in the reduction of NO and $NO_2$ to $N_2$. While the introduction of ammonia or urea from the injection device 17 is shown downstream of the addition of ozone stream 18 as in FIG. 1, alternative exemplary arrangements may introduce the ammonia stream 20 to the exhaust stream 12 prior to the introduction of ozone stream 18.

The exhaust stream 19 treated with ozone and/or ammonia or urea then enters the catalytic reduction reactor 22. The catalytic reduction reactor 22 includes a selective catalytic reduction (SCR) catalyst 24 that may function primarily to substantially reduce NO, $N_2O$ and $NO_2$ (i.e. $NO_x$) to $N_2$ and water.

Finally, the exhaust stream 25 flows through a diesel particulate filter 26 to remove any remaining particulate matter and exits through a tailpipe (not shown) or similar type device to the atmosphere. In alternative exemplary arrangements, the diesel particulate filter 26 may be placed after the catalytic oxidation reactor 14 to filter the exhaust stream 12 prior to entering the catalytic reduction reactor 22. The diesel particulate filter may be formed from various materials, including cordierite or silicone-carbide, which traps particulate matter.

The catalytic oxidation reactor 14 replaces the dual zone type catalytic oxidation reactor, which is often used with an SCR catalyst. In a dual zone type catalytic oxidation reactors, the exhaust stream first passes through a platinum- and palladium-containing front side, which oxidizes hydrocarbons and carbon monoxide to carbon dioxide, and subsequently passes through a platinum-only containing rear side, which oxidizes NO to $NO_2$.

The catalytic oxidation reactor 14, by contrast, is a single zone type catalytic oxidation reactor that may be substantially smaller and oxidizes hydrocarbons and carbon monoxide to carbon dioxide. This smaller size may allow faster warm-up of the downstream SCR catalyst 24, which may lead to improved $NO_x$ reduction and enhanced fuel economy.

Figure 2:
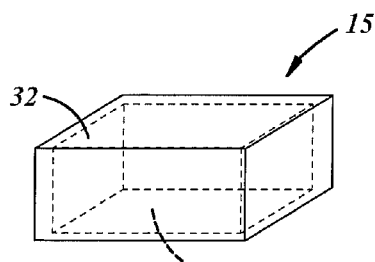
FIG. 2 is a perspective view of the catalytic oxidation reactor according to one exemplary embodiment.

As shown best in FIG. 2, the DOC catalytic material 15 may be formed from a washcoat 32 applied to a conventional ceramic substrate material 34 such as cordierite, which may allow for easier manufacturing. From a compositional standpoint, the amount of platinum per unit volume of the washcoat 32, and hence the DOC catalytic material 15, may be substantially decreased, or even eliminated, as compared with the DOC catalytic material in the dual zone type catalytic oxidation reactors, which may lead to increased cost savings. In addition, by applying a single washcoat 32 over the entirety of the substrate material 34, as opposed to application of two distinct washcoats to the front side and back side of the ceramic substrate as in dual zone DOC's, additional manufacturing costs and material costs may be realized.

In one group of exemplary embodiments, the composition of the washcoat 32 of the DOC catalytic material 15 may vary from about 100 percent palladium to about 50 volume percent palladium and 50 volume percent platinum. In these exemplary embodiments, the washcoat 32 may be coated onto the substrate 34 at about 10-100 g/ft$^3$. The washcoat 32 may include other support materials.

Figure 3:
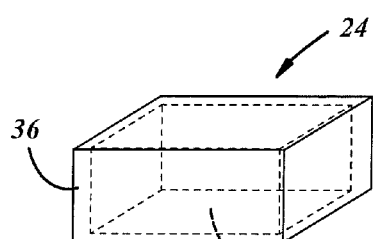
FIG. 3 is a perspective view of the catalytic reduction reactor according to one exemplary embodiment.

As best shown in FIG. 3, the SCR catalyst 24 is formed from a washcoat 36 including a base metal as the active material contained in a zeolite material and other support materials coupled to a conventional substrate material 38 such as cordierite. The base metal aids in converting NO and $NO_2$ to $N_2$ and water which is discharged through the tailpipe (not shown) as an emission. The $NO_x$ conversion rate of the base metal reaction is generally considered the rate limiting step of the system 10 in the conversion of exhaust gases to suitable tailpipe emissions such as $N_2$ and water.

Examples of base metals that may be used in the exemplary embodiments include but are not limited to copper and iron coupled within a zeolite structure. One exemplary SCR catalyst includes Cu/ZSM-5 catalyst particles containing about 2.5 weight percent of copper.

Maximum NOx reduction performance of the SCR catalyst 24 is often achieved at a substantially equimolar ratio (1:1 ratio) of NO and $NO_2$ in the exhaust stream 19, especially at lower temperatures (such as start up or warm up conditions for the engine) where the SCR catalyst 24 does not convert $NO_x$ to $N_2$ at its maximum efficiency. In addition, at the 1:1 ratio, the detrimental effects of high space velocity and SCR catalyst 24 aging can be minimized.

In one group of exemplary embodiments, the amount of ozone generated within the ozone generator 16 and introduced into the exhaust stream 13 may be precisely controlled to achieve the desired substantially equimolar ratio of NO and $NO_2$ in the exhaust gas to increasing $NO_x$ conversion at temperatures below which the SCR catalyst 24 works at maximum efficiency, typically under start up or warm up conditions.

For example, where the SCR catalyst 24 utilizes copper or iron as the base metal such as the Cu/ZSM-5 catalyst material, maximum efficiency for the SCR catalyst 24 may not be achieved until the SCR catalyst 24 is heated to about 250 degrees Celsius. At about 250 degrees Celsius and above, the SCR catalyst 24 may function at a high enough efficiency to convert all the $NO_x$ gases to $N_2$ without the need for ozone supplementation to the exhaust stream 13.

In one exemplary embodiment, the ozone generator 16 may be coupled to a sensor, such as a $NO_x$ sensor 28 or similar device, which determines the relative amounts of NO and $NO_2$ in the $NO_x$ exhaust gas 13 prior to entering the catalytic reduction reactor 22. In addition, or in the alternative, the ozone generator 16 may be coupled to a catalytic reduction reactor temperature sensor 30 that measures the temperature of the SCR catalyst 24 in the catalytic reduction reactor 22.

The ozone generator 16 therefore may adjust the amount of ambient air and/or exhaust converted to ozone, and hence the amount of NO to be oxidized by the ozone to $NO_2$ in the exhaust stream 12, by adjusting the level of electrical power supplied to the ozone generator 16 as a function of either the composition of the $NO_x$ exhaust gas prior to entering the catalytic reduction reactor 22 as measured by the $NO_x$ sensor 28, the temperature of the SCR catalyst 24 as measured by the temperature sensor 30, or more preferably as a function of both the composition of the $NO_x$ exhaust gas 13 prior to entering the catalytic reduction reactor and the temperature of the SCR catalyst 24.

Thus, in one exemplary embodiment, wherein the system 10 includes the $NO_x$ sensor 28 but no temperature sensor 30, when the exhaust stream 13 has a high content of NO relative to $NO_2$ prior to entering the catalytic reduction reactor 22, the electrical power of the ozone generator 16 may be increased or maintained in an on position (i.e. a "plasma on" position) to increase the amount of ozone generated. Conversely, when the $NO_x$ sensor 28 senses that the NO content is lower (i.e. at around a 1:1 ratio of NO to $NO_2$ or less), the electrical power to the ozone generator 16 may be decreased or turned off (i.e. a "plasma off" position) to decrease or eliminate the amount of ozone generated.

In another exemplary embodiment, wherein the system 10 does not include a $NO_x$ sensor 28 but includes a temperature sensor 30, the amount of electrical power to the ozone generator 16 is increased or placed in a "plasma on" position when the temperature of the SCR catalyst 24 is below the temperature which the SCR catalyst works at maximum efficiency, while the electrical power to the ozone generator 16 is decreased or switched to a "plasma off" position when the temperature of the SCR catalyst 24 is at or above the temperature in which it works at maximum efficiency. For example, when the SCR catalyst 24 is Cu/ZSM-5 as described above, the ozone generator 16 is in a "plasma on" position or higher electrical power position when the SCR catalyst is below about 250 degrees Celsius to pump ozone into the exhaust stream 13, and is switched to a "plasma off" position or lower electrical power position when the temperature reaches 250 degrees Celsius or greater, where the Cu/ZSM-5 catalyst is capable of converting $NO_x$ at its maximum efficiency regardless of NO or $NO_2$ content.

In yet another exemplary embodiment, wherein the system 10 includes both a $NO_x$ sensor 28 and a temperature sensor 30, the amount of electrical power to the ozone generator 16 may be increased, or placed in a "plasma on" position, when the temperature of the SCR catalyst 24 is below which it converts $NO_x$ at its maximum efficiency and when the exhaust stream 13 has a high content of NO relative to $NO_2$ prior to entering the catalytic reduction reactor 22. When the temperature of the SCR catalyst 24 is above the temperature in which it converts $NO_x$ at its maximum efficiency regardless of the $NO_x$ content, or when the NO to $NO_2$ content is at a 1:1 ratio or lower at a temperature below SCR catalyst maximum efficiency, the ozone generator 16 is placed in a "plasma off" position or lower electrical power position to limit or eliminate the amount of ozone entering the exhaust stream.

In still another exemplary embodiment, the afore-mentioned $NO_x$ sensor 28 and temperature sensor 30 could also be coupled to the ammonia or urea injector 17 and thus used to separately control the introduction of ammonia or urea into the exhaust stream 13.

Figure 4:
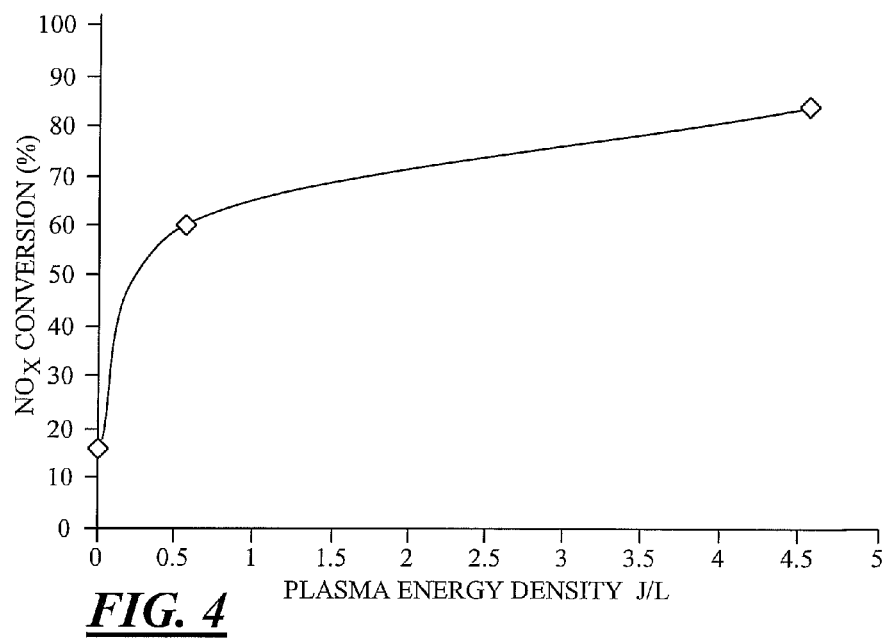
FIG. 4 is a graphical illustration comparing NOx conversion percentage versus plasma energy density for one exemplary embodiment.

FIG. 4 illustrates the effect of plasma energy density on the $NO_x$ conversion performance of a plasma-assisted $NH_3$/SCR system according to one exemplary embodiment, where a sidestream plasma device was used as the ozone generator and wherein a 2.5% Cu/ZSM-5 was used as the SCR catalyst 24. The exhaust stream 12 contained 190 ppm NOx with the $NO_2$/NOx ratio of 0.08. An $NH_3$ stream 20 was injected to the exhaust stream 13 using the $NH_3$ injector 17, resulting in the $NH_3$ concentration of 190 ppm in the exhaust stream 19. The temperature of the catalytic reduction reactor 22 was 210° C. The beneficial effect of the sidestream air plasma increased the $NO_x$ conversion performance from 16% with plasma off to ~85% with plasma on.

The exemplary embodiments illustrate a $NO_x$ reduction system may have many advantages over conventional systems. The thrifted DOC 14 of the exemplary embodiments is smaller than traditional DOC, which may allow for faster warm-up of the SCR catalyst 24, which may in turn provide increased conversion of $NO_x$, on a percentage basis, associated with the faster warm-up while the system is in operation. Moreover, by reducing or eliminating the use of platinum in the thrifted DOC, a cost savings may be realized. Further, a smaller DOC with a single washcoat, as compared with a dual zone washcoat, may be easier to manufacture with reduced raw material costs.

In addition, the use of an ozone generator 16 during warm-up periods, in conjunction with or separate from the introduction of ammonia, may provide a method for producing $NO_2$ more reliably, which may allow for an increase in the percent conversion of $NO_x$ at temperatures below 250 degrees Celsius. Further, by providing a controllable ozone generator, an electric device, may provide a method for most efficiently and reliably converting NO to $NO_2$ throughout the lifetime of a vehicle.

The above description of embodiments of the invention is merely exemplary in nature and, thus, variations thereof are not to be regarded as a departure from the spirit and scope of the invention.

What is claimed is:

1. An emission system for treating a $NO_x$-containing exhaust stream comprising:
   an exhaust conduit;
   a catalytic reduction reactor comprising a selective catalytic reduction catalyst connected to the exhaust conduit;
   a single zone catalytic oxidation reactor comprising a thrifted diesel oxidation catalyst that includes a single washcoat composition, said single zone catalytic oxidation reactor located upstream of said catalytic reduction reactor connected to the exhaust conduit; and
   an ozone generator connected to the exhaust conduit at a location upstream of said catalytic reduction reactor.

2. The emission system of claim 1 further comprising:
   an ammonia or urea injection device located upstream of said catalytic reduction reactor.

3. The emission system of claim 1 further comprising:
   a diesel particulate filter.

4. The emission system of claim 1 further comprising:
   a temperature sensor for measuring said temperature of said SCR catalyst, said temperature sensor being coupled to said ozone generator; and
   a $NO_x$ sensor coupled to said ozone generator, said $NO_x$ sensor located with the $NO_x$-containing exhaust stream at a location upstream from said catalytic reduction reactor.

5. The emission system of claim 4, wherein said ozone generator generates ozone that is introduced to the $NO_x$ containing exhaust stream when the temperature of said selective catalytic reduction catalyst is below a temperature as sensed by said temperature sensor at which said selective catalytic reduction catalyst converts $NO_x$ gases in the $NO_x$-containing exhaust stream to nitrogen and water at its maximum efficiency.

6. The emission system of claim 4, wherein said ozone generator introduces a sufficient amount of ozone to the $NO_x$-containing exhaust stream to oxidize nitrogen oxide to nitrogen dioxide to achieve a substantially equimolar ratio of nitrogen oxide and nitrogen dioxide in said $NO_x$-containing exhaust stream prior to said $NO_x$-containing exhaust stream entering said catalytic reduction reactor when the NO:$NO_2$ ratio in the $NO_x$ containing exhaust stream as sensed by said $NO_x$ sensor is greater than about 1:1.

7. The emission system of claim 4, wherein said ozone generator introduces a sufficient amount of ozone to the $NO_x$-containing exhaust stream to oxidize nitrogen oxide to nitrogen dioxide to achieve a substantially equimolar ratio of nitrogen oxide and nitrogen dioxide in said $NO_x$-containing exhaust stream prior to said $NO_x$-containing exhaust stream entering said catalytic reduction reactor when the temperature of said selective catalytic reduction catalyst as sensed by said temperature sensor is below said temperature at which said selective catalytic reduction catalyst converts $NO_x$ gases in the $NO_x$-containing exhaust stream to nitrogen and water at its maximum efficiency and when the NO:$NO_2$ ratio in the $NO_x$-containing exhaust stream as sensed by said $NO_x$ sensor is greater than about 1:1.

8. The emission system of claim 2 further comprising:
a temperature sensor for measuring said temperature of said SCR catalyst, said temperature sensor being coupled to said ammonia or urea injection device and said ozone generating device; and
a $NO_x$ sensor coupled to said ammonia or urea injection device and said ozone generating device, said $NO_x$ sensor located within the $NO_x$-containing exhaust stream at a location upstream from said catalytic reduction reactor.

9. The emission system of claim 1, wherein the single washcoat composition of said diesel oxidation catalyst varies from about 100 percent palladium to about 50 volume percent palladium and 50 volume percent platinum.

10. The emission system of claim 9, wherein said diesel oxidation catalyst comprises said single washcoat composition applied to a ceramic substrate material at about 10-100 g/ft$^3$.

11. The emission system of claim 1, wherein said selective catalytic reduction catalyst comprises a washcoat applied to a substrate material, said washcoat comprising a base metal as the active material contained in a zeolite material.

12. The emission system of claim 11, wherein said base metal is selected from the group consisting of copper and iron.

13. A method for treating nitrogen oxides, comprising NO and $NO_2$, in an exhaust stream from a lean-burn combustion source, the method comprising:
(a) providing an exhaust system for treating said exhaust stream comprising:
a catalytic reduction reactor having a selective catalytic reduction catalyst;
a catalytic oxidation reactor having a thrifted diesel oxidation catalyst, said catalytic oxidation reactor located upstream of said catalytic reduction reactor;
an ozone generator located upstream of said catalytic reduction reactor;
(b) determining a temperature of said selective catalytic reduction catalyst; and
(c) passing a stream of ambient air through said ozone generator to generate a quantity of ozone sufficient to react with a quantity of NO in the exhaust stream to form $NO_2$ and thereby achieve about an equimolar amount of NO and $NO_2$ in the exhaust stream upstream of said catalytic reduction reactor, wherein said ozone generator only passes said stream when said determined temperature is below a temperature at which said selective catalytic reduction catalyst converts $NO_x$ gases in the exhaust stream to nitrogen and water at its maximum efficiency.

14. The method of claim 13 further comprising:
(d) providing an ammonia or urea injector device; and
(e) injecting a quantity of ammonia or urea to the exhaust stream from said ammonia or urea injector device at a position upstream of said catalytic reduction reactor, wherein said amount of said quantity of ammonia or urea is sufficient to react with a quantity of NOx to form $N_2$, wherein said ammonia or urea injector device only injects said quantity of ammonia or urea when said determined temperature is above a temperature at which said selective catalytic reduction catalyst converts $NO_x$ gases in the exhaust stream to nitrogen and water.

15. The method of claim 13, wherein (c) passing a stream of ambient air through said ozone generator comprises:
coupling a $NO_x$ sensor within the exhaust stream upstream of said catalytic reduction reactor;
coupling said $NO_x$ sensor to said ozone generator;
measuring the concentration of NO and $NO_2$ in the exhaust stream using said $NO_x$ sensor; and
determining a quantity of ozone to generate and introduce to the exhaust stream using said ozone generator, wherein said quantity of ozone is sufficient to react with a quantity of NO in the exhaust stream to form $NO_2$ and thereby achieve about an equimolar amount of NO and $NO_2$ in the exhaust stream upstream of said catalytic reduction reactor.

16. The method of claim 13, wherein (a) providing an exhaust system comprises:
forming a catalytic reduction reactor having a selective catalytic reduction catalyst;
forming a catalytic oxidation reactor having a thrifted diesel oxidation catalyst;
providing an ozone generator;
coupling said ozone generator to said catalytic reduction reactor and said catalytic oxidation reactor to said exhaust stream to form an exhaust system, wherein said catalytic oxidation reactor is upstream of said catalytic reduction reactor within said exhaust stream.

17. The method of claim 16, wherein forming a catalytic oxidation reactor having a thrifted diesel oxidation catalyst comprises:
forming a washcoat including a diesel oxidation catalyst; and
applying said washcoat to a ceramic substrate material.

18. The method of claim 17, wherein the composition of said diesel oxidation catalyst varies from about 100 percent palladium to about 50 volume percent palladium and 50 volume percent platinum.

19. The method of claim 16, wherein forming a catalytic reduction reactor having a selective catalytic reduction catalyst comprises:
forming a washcoat including an selective catalytic reduction catalyst wherein said selective catalytic reduction catalyst comprises a base metal as the active material contained in a zeolite material, wherein said base metal is selected from the group consisting of copper and iron; and
applying said washcoat to a substrate material.

20. A method for treating nitrogen oxides, comprising NO and $NO_2$, in an exhaust stream from a lean-burn combustion source, the method comprising:
(a) providing an exhaust system for treating said exhaust stream comprising:
a catalytic reduction reactor having a selective catalytic reduction catalyst;
a single zone catalytic oxidation reactor having a thrifted diesel oxidation catalyst that includes a single washcoat composition, said single zone catalytic oxidation reactor located upstream of said catalytic reduction reactor;
an ozone generator located upstream of said catalytic reduction reactor;
(b) determining a temperature of said selective catalytic reduction catalyst; and
(c) passing a stream of ambient air through said ozone generator to generate a quantity of ozone sufficient to react with a quantity of NO in the exhaust stream to form $NO_2$ and thereby achieve about an equimolar amount of NO and $NO_2$ in the exhaust stream upstream of said catalytic reduction reactor, wherein said ozone generator only passes said stream when said determined temperature is below a temperature at which said selective catalytic reduction catalyst converts $NO_x$ gases in the exhaust stream to nitrogen and water at its maximum efficiency.

\* \* \* \* \*